United States Patent
Mickle et al.

(10) Patent No.: US 7,528,696 B2
(45) Date of Patent: May 5, 2009

(54) DETERMINING THE THREE-DIMENSIONAL READ ACCURACY OF AN RFID TAG USING A POWER SCALING FACTOR

(75) Inventors: Marlin H. Mickle, Pittsburgh, PA (US); Charles E. Greene, Pittsburgh, PA (US)

(73) Assignee: University of Pittsburgh-Of the Commonwealth System of Higher Education, Pittsburgh, PA (US)

(*) Notice: Subject to any disclaimer, the term of this patent is extended or adjusted under 35 U.S.C. 154(b) by 69 days.

(21) Appl. No.: 11/741,233

(22) Filed: Apr. 27, 2007

(65) Prior Publication Data

US 2007/0296586 A1    Dec. 27, 2007

Related U.S. Application Data

(60) Provisional application No. 60/796,299, filed on Apr. 28, 2006.

(51) Int. Cl.
*H04Q 5/22* (2006.01)

(52) U.S. Cl. ............... 340/10.1; 340/10.4; 340/825.69; 340/825.72; 455/245.1; 455/24; 455/67.11; 455/69; 455/13.4

(58) Field of Classification Search ............... 340/10.1, 340/10.4, 825.69, 825.72, 7.2, 7.32, 7.37; 455/245.1, 24; 375/148, 350, 142
See application file for complete search history.

(56) References Cited

U.S. PATENT DOCUMENTS

| 6,535,723 B1 | 3/2003 | Jiang et al. |
| 6,928,104 B2 | 8/2005 | Pan et al. |
| 7,319,397 B2 * | 1/2008 | Chung et al. ............. 340/572.4 |

* cited by examiner

*Primary Examiner*—Brian A Zimmerman
*Assistant Examiner*—Vernal U Brown
(74) *Attorney, Agent, or Firm*—Eckert Seamans Cherin & Mellott, LLC; Philip E. Levy, Esq.

(57) ABSTRACT

A method of generating a normalized matrix for use in determining one or more read accuracies of an RFID tag at selected points in space relative to a transmitter associated with the RFID tag. The method may further include using the normalized matrix to determine a particular read accuracy of the RFID tag at a particular point in space relative to the transmitter. Also, a method of generating a power scaling factor for determining the read accuracy of an RFID tag.

14 Claims, 2 Drawing Sheets

DETERMINING THE THREE-DIMENSIONAL READ ACCURACY OF AN RFID TAG USING A POWER SCALING FACTOR

CROSS-REFERENCE TO RELATED APPLICATION

This application claims the benefit of U.S. Provisional Application No. 60/796,299, entitled "Determining the Three-Dimensional Read Accuracy of an RFID Tag Using a Power Scaling Factor" which was filed on Apr. 28, 2006, the disclosure of which is incorporated herein by reference.

FIELD OF THE INVENTION

The present invention relates to radio frequency identification (RFID) tag systems, and in particular to a method for determining a power scaling factor for a radio frequency identification tag system and using the power scaling factor to determine the three-dimensional read accuracy of an RFID tag used in the system.

BACKGROUND OF THE INVENTION

In Radio Frequency Identification (RFID) applications, it is beneficial to know the three-dimensional space in which a tag will operate with respect to the interrogating transmitter. A meaningful evaluation becomes a very complex problem containing numerous variables including transmitted power, antenna gains, orientation, etc., and many discrete points even for a relatively coarse discretization. One well-known equation used to approximate the power that a tag can receive from an interrogating transmitter is the Friis Equation. However, the commonly used form of the Friis Equation contains assumptions that limit the validity to a single point, orientation, and polarization in space, which is usually the most favorable. These simplifications eliminate the reflection coefficients and polarization terms, and the gains lose their angular dependences.

It has been shown that the power at a receiving antenna, specifically an RFID tag, can be found using the Friis Equation shown below.

$$P_R = P_T \frac{G_T(\theta_T, \phi_T) G_R(\theta_R, \phi_R) \lambda^2}{(4\pi r)^2} (1 - |\Gamma_T|^2)(1 - |\Gamma_R|^2) |\hat{p}_T \cdot \hat{p}_R|^2 \quad (1)$$

Where:
$P_R$—received power
$P_T$—transmit power
$G_R(\theta_R, \phi_R)$—angular dependent receiver (tag) gain
$G_T(\theta_T, \phi_T)$—angular dependent transmitter gain
$\Gamma_T$—transmitter reflection coefficient
$\Gamma_R$—receiver reflection coefficient
$\hat{p}_T$—transmitter polarization vector
$\hat{p}_R$—receiver polarization vector
r—distance between the transmitter and receiver
$\lambda$—wavelength Generally, in RFID applications, the maximum read range is calculated and specified by taking the maximum values of the gain terms and eliminating reflection and polarization loss terms as shown in the following equation.

$$r_{max} = \frac{\lambda}{4\pi} \sqrt{\frac{P_T G_T G_{TAG}}{P_{min}}} \quad (2)$$

The maximum read range is very commonly used as a figure of merit when comparing the operations of different RFID tags. The main problem with this comparison is that it does not give information on how the tag will operate in general when not optimally located in the main beam with matched polarization. It would be much more beneficial to compare the three-dimensional volume (enclosed by a surface area) of operation for RFID tags, specifically, where the tag can be powered for a given percentage of all possible orientations and polarizations (in discretized form). This can be accomplished by solving the Friis Equation shown in (1). However, the computational problem quickly grows to a size which makes it impractical to solve. As an example, for a tag at a given point in space there are 64,800 gain values for a one-degree resolution (180°×360°). This means the tag can be positioned in one of 64,800 possible orientations with respect to the interrogating transmitter. The problem is complicated further when the effects of polarization are included. At a given point in space with a given gain value (1 of 64,800), there are 360 possible polarization positions for a one-degree resolution. This number can be reduced to 90 possible polarizations by the realization that all four quadrants will produce the same results. Therefore, at a given point in space there are 5,832,000 possible gain and polarization positions. If the problem is then solved for one cubic meter in front of the interrogating transmitter in 10 cm steps, there are 1000 points with each having 5,832,000 possible gain and polarization positions. The result is 5,832,000,000 positions for a one cubic meter volume. If it is assumed that the results are stored in 32-bit (4-byte) floating point numbers, the amount of memory needed would be 23.328 giga-bytes (GB), which is not practical on most computer systems. Given this result, it is obvious that a method is needed for determining the RFID system operating envelope (volume) that is manageable and yet useful for evaluating the performance of the overall system.

SUMMARY OF THE INVENTION

The present invention provides a mathematical model that describes the operation of a tag in the far-field with a realistic perspective of a three-dimensional space. The complete form of the Friis equation in conjunction with the reported power-scaling factor method will be used as the basic formulation to model the amount of power a tag can receive for any orientation at a given point in space at an accuracy specified in terms of the percentage of positions, orientations, etc., at which the tag can be read for a specified interrogator level.

In one embodiment, the present invention provides a method of generating a power scaling factor for use in determining the read accuracy of an RFID tag. The method includes defining a 3-D matrix for the RFID tag, wherein a first axis in the matrix represents theta values (rotation about a first axis) for the RFID tag according to a first discretization (e.g., one degree), a second axis in the matrix represents phi values (rotation about a second axis orthogonal to the first axis) for the RFID tag according to a second discretization (e.g., one degree), and a third axis in the matrix represents polarization values for the RFID tag according to a third discretization, and wherein each position in the 3-D matrix identified by a particular theta, phi and polarization is a gain variable for the RFID tag. The method further includes determining a gain value for each gain variable when the RFID tag is located at a first point in space to create a solved 3-D matrix, and defining a first set of values including a transmitter gain, a transmitted power, and a wavelength for a transmitter associated with the RFID tag and a minimum operating power for the RFID tag. The method then includes varying the distance between the RFID tag and the transmitter to locate the RFID tag at a second point in space, calculating the power received by the RFID tag at the second point for all gain and polarization combinations specified in the solved 3-D matrix using the first set of values and a distance between the second point and the transmitter, determining the maximum of the calculated powers, and determining the power scaling factor by dividing the maximum of the calculated powers by the minimum operating power for the RFID tag.

Preferably, the first point in space is an optimum, most favorable point in space for the RFID tag relative to the transmitter. The method may further include using the power scaling factor to determine a read accuracy of all possible orientations according to said first and second discretizations and polarizations according to said third discretization of the RFID tag at a selected point in space relative to the transmitter. The method may still further include using the power scaling factor to determine a volume in space relative to the transmitter at which the RFID tag will have a specified read accuracy.

In another embodiment, the invention provides a method of generating a normalized matrix for use in determining one or more read accuracies of an RFID tag at selected points in space relative to a transmitter associated with the RFID tag. The method includes generating a first 3-D matrix for the RFID tag, wherein a first axis in the first 3-D matrix represents theta values for the RFID tag according to a first discretization, a second axis in the first 3-D matrix represents phi values for the RFID tag according to a second discretization, and a third axis in the first 3-D matrix represents polarization values for the RFID tag according to a third discretization, and wherein each position in the first 3-D matrix is a power value determined by solving the Friis equation for the RFID tag at a first selected point in space relative to the transmitter using the particular theta value, phi value and polarization value of the position in the first 3-D matrix. The method further includes determining the maximum of the power values in the first 3-D matrix, generating a scaling factor by dividing the maximum of the power values by the minimum operating power of the RFID tag, generating a second 3-D matrix by dividing each of the power values in the first 3-D matrix by the minimum operating power to thereby create a plurality of second 3-D matrix values in the second 3-D matrix, and generating the normalized matrix by dividing each of the second 3-D matrix values by the scaling factor to thereby create a plurality of normalized matrix values in the normalized matrix. In a particular embodiment, the invention also provides a computer readable medium having computer executable instructions for performing the method just described. Furthermore, the transmitter has a given transmitter gain and a given transmit power and wavelength. Thus, the step of solving the Friis equation for the RFID tag uses the given transmitter gain and the given transmit power and wavelength.

In one particular embodiment, the method further includes using the normalized matrix to determine a particular read accuracy of the RFID tag at a particular point in space relative to the transmitter. Preferably, the step of using the normalized matrix to determine a particular read accuracy of the RFID tag at a particular point in space relative to the transmitter includes determining a maximum power received by the RFID tag at the particular point in space (the maximum power received being a power received when the RFID tag is in an optimum, most favorable position at the particular point in space), determining a second scaling factor by dividing the maximum power received by the minimum operating power of the RFID tag, generating a third 3-D matrix by multiplying each of the normalized matrix values in the normalized matrix by the second scaling factor to thereby create a plurality of third 3-D matrix values in the third 3-D matrix, and generating the particular read accuracy by determining the percentage of the third 3-D matrix values that are greater than or equal to one. In another particular embodiment, the invention also provides a computer readable medium having computer executable instructions for performing the method embodiment just described.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
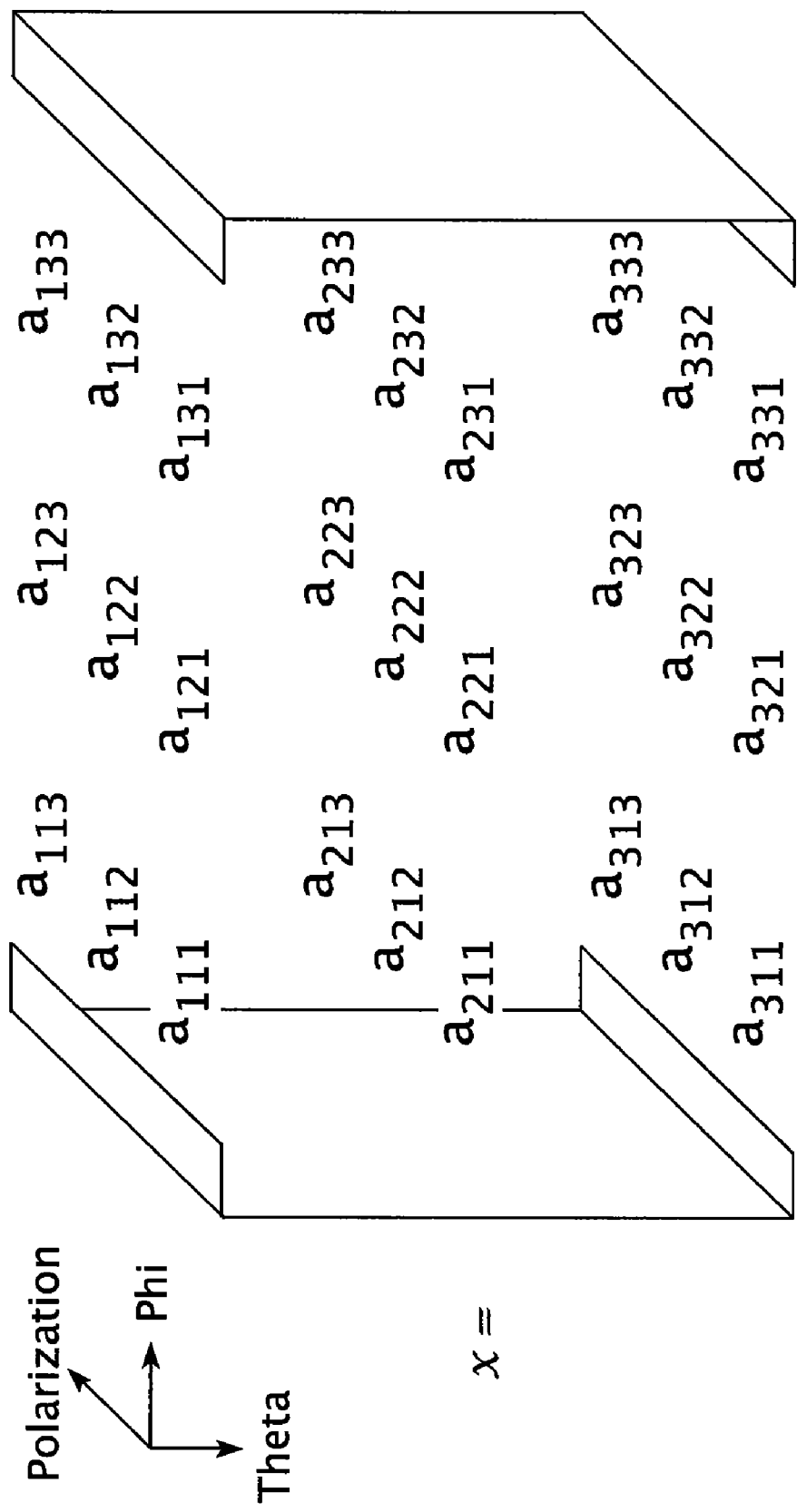
FIG. 1 is a schematic representation of a three-dimensional matrix including gain and polarization values that is employed in an embodiment of the present invention.

As described elsewhere herein, solving the three-dimensional operating envelope for an RFID system can quickly become a massive problem not only from a processing time point of view but also from a pure memory standpoint. The simple example given elsewhere herein required 23.3 GB of data store to solve a mere 1000 points. As can be seen, the solution can easily spiral out of control if more and more data points are required. The solution to this dilemma is a method to solve the problem that answers the proposed question of operability for an RFID tag given the ability to be in essentially any position. To do this, the question must be explored in more detail. What data are really required? It is obvious from the current literature that the typical figure of merit, the maximum read range, is of no use when examining three-dimensional operation. Therefore, it must be determined what performance criterion is required. One important parameter presented in the literature is the read accuracy.

Read accuracy in the present context is the theoretical and mathematical determination at all points where an RFID tag should work in a three-dimensional (3D) space. The determination of a sufficiently precise discretization of the 3D space is a huge computational problem which is greatly reduced by the use of the power scaling factor described herein. This factor thus makes it practical to calculate all points in a discretized 3 D space where closed form mathematical expressions for the physics involved can be evaluated and tabulated.

Companies exploring RFID adoption are concerned with the read accuracy of the tags because a missed read will likely mean lost income for the product and obviously reduced profits. There has been work done by numerous companies in predicting the read accuracy of RFID tags in various orientations. See for example, Young M. Lee, Feng Cheng, and Ying Tat Leung, "Exploring the Impact of RFID on Supply Chain Dynamics," Proceedings of the 2004 Winter Simulation Conference, 2004 and Mary Catherine O'Connor, "Integral RFID Looks for RF Hot Spot, "RFID Journal", Mar. 23, 2005. However, there has not been a comprehensive analysis of an RFID tag with the ability to assume any possible position and orientation. It is, therefore, an object of the present invention to provide data relative to the read accuracy of an RFID tag when it is free to take on any position and orientation in a three-dimensional space. Read accuracy is defined here as the percentage of tag orientations and polarizations that can be read relative to a fixed reader position. This measure represents a strictly physical/mathematical solution that serves as a figure of merit against which the in situ evaluations can be compared. In this sense, the methodology described herein is a limit under ideal conditions in free space. In particular, variations may occur due to reflections from surrounding objects and variations in manufacturing, handling, etc. The read accuracy described herein is deterministic while in situ results are based on a statistical figure of merit.

There is still the problem of the large amount of data that needs to be calculated, which can be addressed by defining a specific scenario. As an example, an RFID tag in a shopping cart is considered. The tag can take on any position and orientation and moves along a line in front of the reader. This realization simplifies the problem by only requiring data be calculated on the line of movement. The massive data problem still exists even though it has been greatly simplified due to the large number of points on the line.

To simplify the problem further, a technique has been developed and described herein to reduce an intense set of calculations to a single point. The technique was developed using the fact that the gain of the tag antenna and polarization are the only variables in the Friis equation that are affected by the tag's position at a single specified point in space. Therefore, these two variables can be combined into a three-dimensional matrix, $\chi$, while the remainder of the Friis equation can be view as an RFID system dependent constant, $\kappa$, and a distance variable, $\Gamma$. These parameters are shown in the following equations where the elements of the Friis equation are grouped into two separate entities as shown in (3) and (4) from which the Friis equation can simply be written as in (5) using both $\kappa$ and $\chi$. A pictorial representation of $\chi$ can be seen in FIG. 1.

$$\chi(\theta, \phi, \psi) = G_{TAG}(\theta, \phi)|\hat{p}_T \Box \hat{p}_R|^2 = G_{TAG}(\theta, \phi)\cos^2(\psi) \quad (3)$$

$$\kappa = \frac{P_T G_{TAG}(\theta_P, \phi_P)\lambda^2}{(4\pi)^2}(1 - |\Gamma_T|^2)(1 - |\Gamma_R|^2) \quad (4)$$

Where
$\theta_p$ is the theta value of the specified point
$\phi_p$ is the phi value of the specified point
(theta ($\theta$) and phi ($\phi$) being the two rotational axes of the tag).
Rewriting the Friis Equation in these terms yields $$P_R = \frac{\kappa \chi}{r^2} \quad (5)$$

The rows of the $\chi$ matrix represent different values of theta, where the columns are the values of phi, and the depth represents a change in psi or polarization. The resulting three-dimensional matrix is a discretized representation of the gain and polarization data representing equation (3). This is generally the case for gain measurements and simulations, which are performed in discrete steps of theta and phi. However, the polarization function is continuous in nature, but it can easily be adapted to discrete angles. As was previously stated, the polarization data are the same for all four quadrants and, thus only one quadrant (ninety degrees) must be considered. Therefore, the gain/polarization matrix will have dimensions of 180×360×90 for a one-degree resolution. The polarization data represented by the depth of the matrix will range from the unmodified three-dimensional gain to a matrix with all zeros in steps determined by the cosine-squared function or polarization loss factor (PLF) given by (6).

$$PLF = \cos^2(\psi) \quad (6)$$

Using the gain/polarization matrix, it becomes possible to solve all gain and polarization combinations at a single point. Because of its widespread use, the optimum (most favorable) point will be chosen as the reference for each point. Due to the fact that the tag is at the optimum position, the transmitter gain is at a maximum and (4) can be simplified. The result is shown in equation (7).

$$\kappa = \frac{P_T G_{TAG-MAX}\lambda^2}{(4\pi)^2}(1 - |\Gamma_T|^2)(1 - |\Gamma_R|^2) \quad (7)$$

The next step is to define values of the transmitter gain, transmitted power, wavelength, and minimum required tag power. These values are arbitrary, and it will be shown that they will cancel out in the end when read accuracy is the goal as a percentage measure. Next, the distance is varied and the power received by the tag for all gains and polarizations is calculated using equation (5). The result is a three-dimensional matrix containing the power received by the tag in all the possible gains and polarizations for a specific discretization. This matrix can easily be evaluated to see what percentage of the points is above the arbitrary minimum power level. The resulting percentage is the powering accuracy for any orientation and polarization at the optimum point with respect to the interrogating transmitter. Dividing the maximum power received (optimum tag orientation and polarization) by the minimum power threshold leads to an interesting observation. This ratio, shown in (8), provides a scaling factor, $S_f$, which enables easy calculations for other points in space.

$$S_f = \frac{P_{R-MAX}}{P_{R-THRESHOLD}} \quad (8)$$

To clarify, if the minimum power level for tag operation is 50 $\mu$W and 90% of the possible orientations and polarizations are above this level, the power received at the tag when in the optimum orientation and polarization, say 5 mW, can be used to calculate a scaling factor of $$\frac{5 \text{ mW}}{50 \text{ }\mu\text{W}}$$

or 100. Using this realization, it can be seen that if the tag in this example receives 100 times the minimum operating power level at its optimum position, the powering accuracy at that point will be 90% when examining all possible orientations and polarizations of the RFID tag.

Different read accuracies can be determined by varying the distance in the arbitrary system. This will change the maximum power level while the threshold power level remains constant, thus it is simply a change in the scaling factor. The system is arbitrary due to the ratio taken at the end of the process. The transmitter gain, transmitter power, wavelength, and reflection coefficients simply divide out as shown in (9). Therefore, the scaling factor is independent of these values and can be determined using only the gain and polarization data of the tag antenna.

$$S_f = \frac{P_{R-\text{MAX}}}{P_{R-\text{THRESHOLD}}} \qquad (9)$$

$$= \frac{\frac{P_T G_T \lambda^2}{(4\pi r)^2}(1-|\Gamma_T|^2)(1-|\Gamma_R|^2)G_{\text{TAG-MAX}}}{\frac{P_T G_T \lambda^2}{(4\pi r)^2}(1-|\Gamma_T|^2)(1-|\Gamma_R|^2)G_{\text{TAG}}(\theta_P, \phi_P)\cos^2(\psi)}$$

$G_{TAG}(\theta_p, \phi_p)$ and $\cos^2(\psi)$ are the values of the gain and PLF of the tag antenna that provide the arbitrary power level to the tag and vary in order to hold the threshold power level constant.

The minimum power level is also arbitrary for a given powering accuracy. As an example, if it is desired to have a powering accuracy of 90% and the minimum power level is reduced to 25 μW in the previous example, the scaling factor will double to 200 but the read accuracy will be higher than 90%. The distance must then be increased which will in turn reduce the power received in the optimum position and the scaling factor will return to the value of 100 previously calculated.

Consider the simple two-dimensional example of a half-wave dipole antenna gain which results in a 19 by 19 matrix with the repeated column:

col (0,0.03,0.13,0.29,0.51,0.79,1.09,1.37,1.57,1.64, 1.57,1.37,1.09,0.79,0.51,0.29,0.13,0.03,0)  (10)

If these gain data are used in conjunction with the system parameters given in (11), the power received by the RFID tag which results in an equivalent dimensioned matrix with repeated column as given in (12).

$P_T$=1 Watt $G_T$=4

λ=0.328 meters r=1 meters $\Gamma_{T,R}$=0  (11)

col (0,84,342,780,1396,2157,2979,3736,4274,4469, 4274,3736,2979,2157,1396,780,342, 84,0)  (12)

If the arbitrary power threshold is set at 85 microwatts, approximately seventy-nine percent of the orientations and polarizations will receive sufficient power for the tag to operate, and the resulting power-scaling factor will be $$\frac{4469 \text{ }\mu\text{W}}{85 \text{ }\mu\text{W}}$$

or 53. The powered positions are simply the 15 interior rows of the previously described column matrix (12) and are shown in (13).

col ( . . . , 342,780,1396,2157,2979,3736,4274,4469, 4274,3736,2979,2157,1396,780,342, . . . )  (13)

To demonstrate why the power threshold is arbitrary, consider a new threshold of 343 microwatts while specifying a read accuracy of seventy-nine percent, as with the previous case. The new threshold level means the data in (13) are no longer valid. The matrix specified by (14) shows the new data for the parameters given in (11) with a threshold of 343 microwatts. These are simply the 13 interior rows of (13) as shown in (14)

col ( . . . , 780,1396,2157,2979,3736,4274,4469,4274, 3736,2979,2157,1396,780, . . . )  (14)

The RFID system using the parameters in (11) results in a matrix which is simply the interior 13 rows of the matrix described by (12) and yields a read accuracy of only sixty-eight percent, which is below the required value of seventy-nine. Therefore, the distance, r, must be decreased in order to increase the power and thus the read accuracy. If the distance is adjusted from one meter to 0.497 meters, the power received by the tag is increased, which in turn, increases the read accuracy to seventy-nine percent. This results in a new matrix of 19 columns with the 20°, 30°, . . . , 140°, 160° values given in (15):

col (1384,3158,5653,8730,12062,15124,17302,18093, 17302,15124,12062,8731,5653,3158,1384)  (15)

As (15) indicates, the power-scaling factor for the increased threshold level is $$\frac{18093 \text{ }\mu\text{W}}{343 \text{ }\mu\text{W}}$$

or 53, which is the same as previously calculated. Therefore, the threshold level is an arbitrary value for a given read accuracy.

The scaling-factor technique does require a large amount of overhead calculations. The user must specify the desired read accuracy and a computer must be used to search for the corresponding scaling factor. However, once this is done, a constant power contour around the interrogating transmitter can be plotted very quickly for a tag optimally aligned. The contour is at a power level of the scaling factor times the minimum power level needed by the tag. It should be noted that this constant power contour also represents a constant powering accuracy contour. In other words, tags inside the surface contour area are powered at accuracies higher than the contour value and tags outside read at lower accuracies. The contour for a given scaling factor (corresponding to a read accuracy) can be calculated using the following equation.

$$r(\theta, \phi) = \frac{\lambda}{4\pi} \sqrt{\frac{P_T G_T(\theta_T, \phi_T) G_{TAG}(\max)}{S_f P_{\min}}} \qquad (16)$$

Where:

$G_T(\theta_T,\phi_T)$ is the 3D gain of the interrogating transmitter $P_{min}$ is the power level required by the tag $S_f$ is the scaling factor for the desired read accuracy The previous analysis has focused on providing operational power to the tag. As is well known in RFID systems, the tag must be able to receive sufficient power and communicate to the base station in order to be successfully read. Therefore, it becomes important to develop a method for determining whether the tag can transmit (backscatter) its data back to the base station. The power-scaling technique can also be applied to the communicating link by the use of reciprocity.

The receiving base station can be considered the transmitter and the tag can to defined as the receiver. This realization allows the scaling factor from the powering link to be used in order to reduce calculations and processing time. The reciprocal link transmits from the base station to the optimally aligned tag. The resulting power received at the tag is the scaling factor multiplied by the minimum sensitivity. Therefore, the minimum sensitivity required at the base station is the power received in the reciprocal link divided by the scaling factor.

It should be noted that the analysis above is valid when the interrogating transmitter and data receiving base station are collocated. If the data base station is positioned away from the interrogator, functional points will be lost due to the fact that points that can communicate may not have received enough operational power and vice versa. The loss of data points leads to a read accuracy that is slightly less than the specified value. This deviation can be minimized by locating the base station outside the nulls of the tag antenna when it is optimally aligned with the interrogator. Additionally, if a symmetric tag antenna pattern is used, the base station can be located on the broadside axis without a loss of data points.

Figure 2:
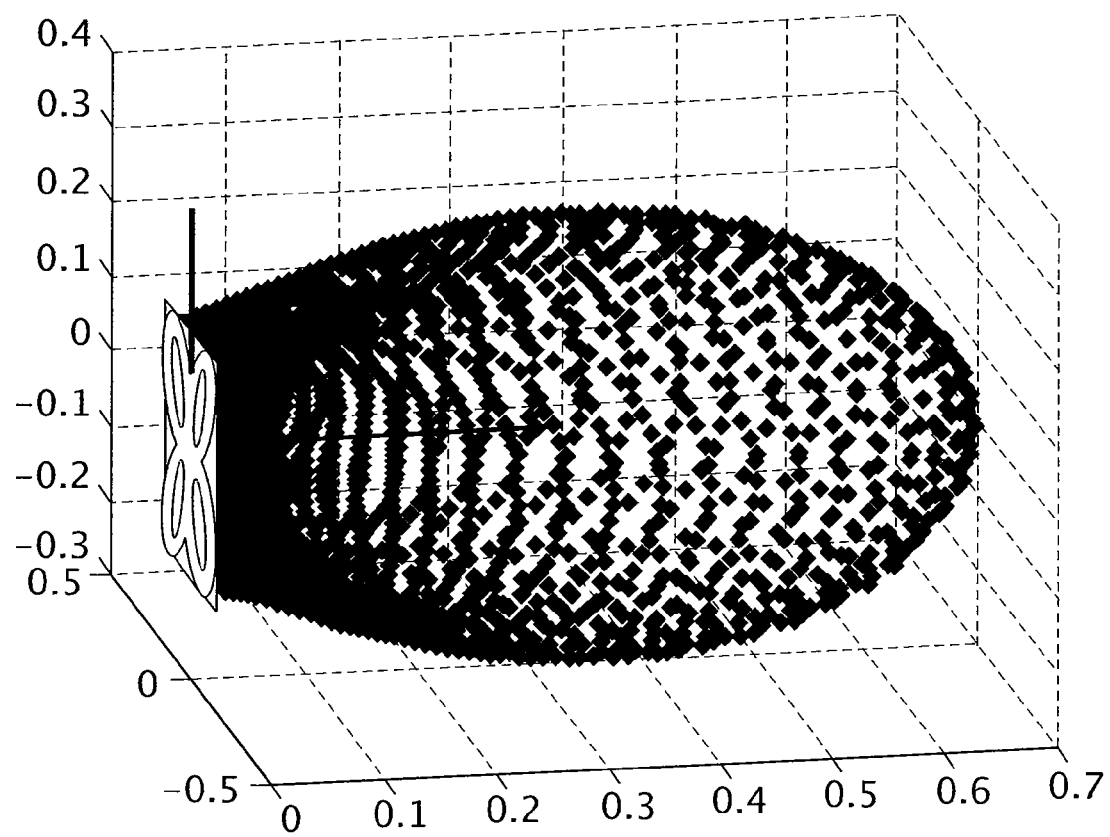
FIG. 2 is a schematic representation of the operational envelope of an ideal dipole antenna wherein the read accuracy is 80%.

The above concepts may be integrated into a single software package that provides the operational envelope for a specific percentage of accurate reads as shown in FIG. 2, where the contour defining the accuracy of essentially 80% is shown. The 3D pattern of FIG. 2 provides the surface indicating the 3D volume in which at least 80% of the tag positions can be read. This 3D view is a part of a Graphical User Interface (GUI) which includes the key parameters of the reader transmitting antenna, the tag characteristics and the reader receiver characteristics that specify the various parameters including relative positions of the reader in a 3 dimensional space. Thus, it is possible to specify alternative positions within a given space so as to be able to place multiple antennas to achieve a 100% read accuracy from the aggregate of the antennas.

The software used to determine the surface of FIG. 2 preferably takes into account the reader antenna, gain, power, etc., along with the antenna, power requirement, etc., for the tag and finally, the receiver characteristics in terms of sensitivity, location, etc. Thus, there is no need to collocate the powering antenna and the receiving antenna. Using the versatility of the software package it is possible to determine the points not read for a given reader location so as to be able to add an addition antenna(s) to theoretically/mathematically obtain a 100% read accuracy.

The power-scaling factor method described herein provides a technique for solving the three-dimensional read accuracy of an RFID system. The technique requires a large number of initial calculations. However, the resulting savings when solving the complete three-dimensional system is immense. The scaling factor technique was developed by the realization that the gain and polarization matrices can be combined to form a very large three-dimensional matrix that, when solved with an arbitrary RFID system, produces a three-dimensional power matrix. The power matrix can then be searched in order to determine the percentage of points above a certain threshold, which is itself arbitrary when compared to the maximum value in the matrix.

The resulting percentage is the corresponding read accuracy of the RFID system based on the ratio of the maximum power in the matrix to the threshold value. This ratio, termed the power-scaling factor, can then be applied to an RFID tag in its optimum position at a specific point to determine the read accuracy of all possible orientations and polarizations in a single calculation. Once the scaling factor is determined, a power threshold can be calculated by multiplying the scaling factor by the minimum power required for tag operation. The solution to the problem is then obtained by plotting a surface of constant power around the interrogating transmitter at the power threshold. This surface area describes a boundary between positions that can read above and below the specified read accuracy. This allows a visualization of where a tag must be in order to read accurately when in any orientation or polarization. The required receiver sensitivity can then be determined by applying the reciprocity theorem to the back-scattered communication link.

The combination of the powering and communicating data can be used to graphically display the area of operation of the tag. This area accurately describes not only where the tag can receive operational power, but also where the tag can successfully transmit (backscatter) its data back to a receiving base station at a specified accuracy.

The ability to display the area of operation of an RFID tag allows the easy comparison of different RFID tags. Generally, tags are compared on the basis of the maximum read range, however this measure gives little information on how the tag will perform in real-life situations that require the tag to work in random positions. As an extreme example, a patch antenna could be used as the tag's antenna to increase the read range of the tag due to the increase in gain and effective area. The problem here is that the tag will in general only work when it is pointed at the interrogating transmitter which may be impractical for certain applications.

The power-scaling factor allows for quick comparison of different RFID tags on the basis of their areas of operation. Tags can also be compared on the value of their scaling factor. The scaling factor tells the evaluator the amount of power the tag must receive when optimally aligned in order to be read at a specific accuracy. Therefore, the scaling factor can be used as a figure of merit to evaluate the performance of various RFID tags.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of generating a power scaling factor for use in determining a read accuracy of an RFID tag, comprising:

defining a 3-D matrix for said RFID tag, wherein a first axis in said matrix represents theta values for said RFID tag according to a first discretization, a second axis in said matrix represents phi values for said RFID tag according to a second discretization, and a third axis in said matrix represents polarization values for said RFID tag according to a third discretization, and wherein each position in said 3-D matrix identified by a particular theta, phi and polarization is a gain variable for said RFID tag;

determining a gain value for each said gain variable when said RFID tag is located at a first point in space to create a solved 3-D matrix;

defining a first set of values including a transmitter gain, a transmitted power, and a wavelength for a transmitter associated with said RFID tag and a minimum operating power for said RFID tag;

varying the distance between the RFID tag and said transmitter to locate said RFID tag at a second point in space;

calculating the power received by the RFID tag at said second point for all gain and polarization combinations specified in the solved 3-D matrix using the first set of values and a distance between said second point and said transmitter;

determining the maximum of said calculated powers; and determining said power scaling factor by dividing said maximum of said calculated powers by said minimum operating power for said RFID tag.

2. The method according to claim 1, wherein said first point in space is an optimum, most favorable point in space for said RFID tag relative to said transmitter.

3. The method according to claim 1, further comprising using said power scaling factor to determine a read accuracy of all possible orientations according to said first and second discretizations and polarizations according to said third discretization of said RFID tag at a selected point in space relative to said transmitter.

4. The method according to claim 1, further comprising using said power scaling factor to determine a volume in space relative to said transmitter at which said RFID tag will have at least a specified read accuracy.

5. The method according to claim 4, wherein said power scaling factor corresponds to said specified read accuracy.

6. The method according to claim 1, wherein said first and second discretizations are each a specified degree and wherein said third discretization is a specified relative angle.

7. The method according to claim 1, wherein said first and second discretizations are each one degree.

8. The method according to claim 1, further comprising using said power scaling factor to determine an amount of power that said RFID tag must receive at a selected point in space relative to said transmitter when said RFID tag is in an optimum position at said selected point in order to be read at a specific read accuracy.

9. A method of generating a normalized matrix for use in determining one or more read accuracies of an RFID tag at selected points in space relative to a transmitter associated with said RFID tag, said RFID tag having a minimum operating power, the method comprising:

generating a first 3-D matrix for said RFID tag, wherein a first axis in said first 3-D matrix represents theta values for said RFID tag according to a first discretization, a second axis in said first 3-D matrix represents phi values for said RFID tag according to a second discretization, and a third axis in said first 3-D matrix represents polarization values for said RFID tag according to a third discretization, and wherein each position in said first 3-D matrix is a power value determined by solving the Friis equation for said RFID tag at a first selected point in space relative to said transmitter using the particular theta value, phi value and polarization value of said position in said first 3-D matrix;

determining the maximum of said power values in said first 3-D matrix;

generating a scaling factor by dividing said maximum of said power values by said minimum operating power;

generating a second 3-D matrix by dividing each of said power values in said first 3-D matrix by said minimum operating power to thereby create a plurality of second 3-D matrix values in said second 3-D matrix; and generating said normalized matrix by dividing each of said second 3-D matrix values by said scaling factor to thereby create a plurality of normalized matrix values in said normalized matrix.

10. The method according to claim 9, wherein said transmitter has a given transmitter gain and a given transmit power and wavelength and wherein said step of solving the Friis equation for said RFID tag uses said given transmitter gain and said given transmit power and wavelength.

11. The method according to claim 9, further comprising using said normalized matrix to determine a particular read accuracy of said RFID tag at a particular point in space relative to said transmitter.

12. The method according to claim 11, wherein said step of using said normalized matrix to determine a particular read accuracy of said RFID tag at a particular point in space relative to said transmitter comprises determining a maximum power received by said RFID tag at said particular point in space, said maximum power received being a power received when said RFID tag is in an optimum, most favorable position at said particular point in space, determining a second scaling factor by dividing said maximum power received by said minimum operating power, generating a third 3-D matrix by multiplying each of said normalized matrix values in said normalized matrix by said second scaling factor to thereby create a plurality of third 3-D matrix values in said third 3-D matrix, and generating said particular read accuracy by determining the percentage of said third 3-D matrix values that are greater than or equal to one.

13. A computer readable medium having computer executable instructions for performing the method recited in claim 9.

14. A computer readable medium having computer executable instructions for performing the method recited in claim 12.

* * * * *

UNITED STATES PATENT AND TRADEMARK OFFICE
CERTIFICATE OF CORRECTION

PATENT NO. : 7,528,696 B2  Page 1 of 1
APPLICATION NO. : 11/741233
DATED : May 5, 2009
INVENTOR(S) : Marlin H. Mickle et al.

It is certified that error appears in the above-identified patent and that said Letters Patent is hereby corrected as shown below:

In Column 5, line 49, "a distance variable, $\Gamma$" should be --a distance variable, $r$.--

Signed and Sealed this

Eighth Day of September, 2009

David J. Kappos
*Director of the United States Patent and Trademark Office*